United States Patent Office 3,521,132
Patented July 21, 1970

---

3,521,132
SPRING MOUNTED PRESSURE DIODES
Sigrud R. Petersen, Irwin, and Andrew J. Spisak, Pittsburgh, Pa., assignors to Westinghouse Electric Corporation, Pittsburgh, Pa., a corporation of Pennsylvania
Filed Sept. 11, 1967, Ser. No. 666,782
Int. Cl. H01l 1/12
U.S. Cl. 317—234
11 Claims

ABSTRACT OF THE DISCLOSURE

A heat sink arrangement for resiliently supporting pressure contact diode devices on a mounting surface such as the rim or flange of a rotating rectifier wheel. The diode devices are essentially disc-shaped structures having opposed planar sides. The arrangement comprises at least one such diode disposed between two heat sinks with the planar sides of the diode disposed in physical and electrical contact with planar surfaces of the heat sinks. At least one of the heat sinks is provided with an optimum spring characteristic for forcing the diode device against the other heat sink so that good electrical and thermal contact and conductivity is maintained between the diode and heat sinks. A plurality of diodes are connected in electrical series by being disposed between resilient heat sinks in a stacked array.

BACKGROUND OF THE INVENTION

The present invention relates to mounting and heat sink structures for pressure contact diodes, and particularly to the use of such diodes in excitation systems for synchronous alternating current machines of the brushless type though the invention is not limited thereto.

Synchronous machines of the brushless type employ one or more exciters with means for rectifying the alternating current exciter output to supply direct current excitation to the field winding of a main machine. For this purpose, a rotating diode or rectifier wheel assembly is mounted on a common rotating shaft extending between the field winding of the main machine and the armature winding of the exciter or exciters.

The rectifier wheel assembly usually comprises a plurality of semiconducting diodes mounted on the inside surface of a rim portion of one or more wheels and electrically connected in a suitable excitation circuit (including fuses and voltage dividing resistors) between the exciter armature and the main generator field.

A diode assembly for brushless exciters as used on turbine generators, for example, must be capable of withstanding the high centrifugal forces accompanying the high speed of rotation which is usually 3600 r.p.m. Further, semiconducting diode devices have limited safe operating temperature ranges which requires a construction capable of cooling the diodes. The diodes themselves require heat sinks for dissipating the losses inherent in operation in order to maintain the diodes within their safe operating temperature ranges. The diodes must also be accessible for replacement and repair. Further, fuses have been required to protect the exciter circuit should one or more of the diodes fail and short.

Heretofore, the diode devices employed in the wheel assembly have been elongated, cylindrically-shaped devices having terminal means extending in an axial direction from each end of the device. One terminal end includes a massive metal end piece provided with a threaded nipple and a hexagonal nut-shaped flange. The diode device is mounted by threading the nipple into a tapped hole provided in a mounting structure. The diode device comprises a semiconducting component housed in a bonded ceramic-metal housing welded to the massive metal piece on the side thereof opposite the side of the threaded nipple. The other end of the ceramic housing is closed with a metal terminal cap and lead bonded to the ceramic.

As can be readily appreciated, this type of diode structure is bulky and space consuming. The heat generated in the operating diode device is conducted from only one side or end thereof as best seen, for example, in FIG. 3 of Pat. No. 3,283,219 issued to R. J. Keady on Nov. 1, 1966 and assigned to the present assignee. As shown therein, the nipple portion of diode device 18 is threaded into a single heat sink attached to the rim of a rectifier wheel with the body portion and other terminal (and lead) of the device extending inwardly towards the rotating shaft.

There has more recently been developed smaller, more compact semiconducting devices encapsulated to form low profile, essentially disc-shaped diode units such as shown and described, for example, in copending applications Ser. No. 555,136 (now Pat. 3,437,887, Apr. 8, 1969) and 567,921 (now Pat. 3,443,169, May 6, 1969) filed respectively by T. P. Nowalk et al. and H. R. Camp et al. on June 3 and July 26, 1966 respectively, and assigned to the present assignee. These units have planar, opposed heat dissipating metal sides or surfaces. With such a diode construction and configuration, the diode can be connected with external circuits with the use of heat sinks and other metallic support structures in a compact manner while simultaneously providing more efficient heat dissipation by conducting heat from both sides of the diode device with heat sinks disposed on both sides thereof. Further, a plurality of diode devices can be conveniently connected in electrical series by being simply stacked one upon the other with their contact (terminal) surfaces in physical contact with each other or in contact with heat sink structures disposed between the diode devices.

BRIEF SUMMARY OF THE INVENTION

The present disclosure describes a compact, resilient and effective heat sink structure for mounting disc-shaped or flat package diode devices in such a manner that the heat sink provides a spring bias or pressure on the diode device or devices for both static and rotational operation. This is accomplished by disposing a flat diode package between two heat sink structures, at least one of which has a resilient property, and then bolting or otherwise attaching the heat sink structures to a mounting surface in such a manner that pressure is continuously applied to the diode and its terminal contact surfaces.

The resilient heat sink is designed to operate within the plastic range of its constituent material which permits a design thick enough to provide heat transfer and electrical conductivity while simultaneously providing a large enough deflection for economical and reliable manufacture of the heat sink-diode unit within practical manufacturing tolerances. On rotating equipment the spring design is such that sufficient pressure is produced at standstill for test purposes, and optimum operating pressure is provided at running speed by virtue of the spring's mass forced against the diode by the centrifugal force developed with rotation.

Since the diodes can be conveniently disposed in physical and electrical series, circuit protecting fuses can be eliminated, the serially connected diodes acting as protective devices for the circuits since the shorting of one diode leaves other in the circuit for performing the rectifying function.

THE DRAWINGS

The objects and advantages of the invention will be apparent from the following detailed description taken in conjunction with the accompanying drawings, in which:

FIGS. 1 and 2 respectively show mechanical and electrical schematic diagrams of a brushless synchronous system in which rotating diodes are employed;

PREFERRED EMBODIMENTS OF THE INVENTION

Figure 1:
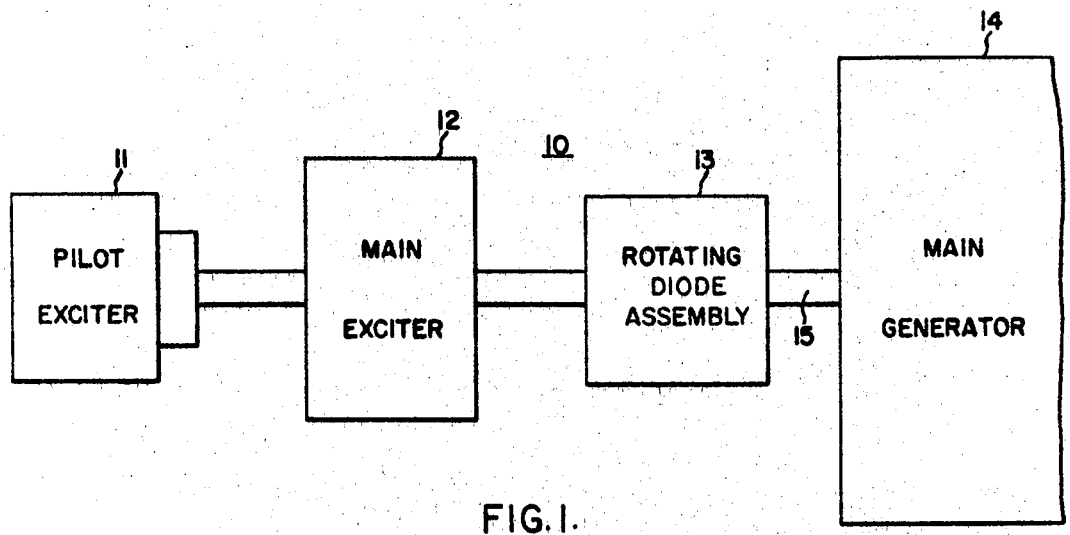

Specifically, there is shown in FIG. 1, an alternating current power generating system generally designated 10. The system 10 includes a pilot exciter 11, a main AC exciter 12, a rotating diode assembly 13, and a main generator 14. A shaft 15, which is either directly connected or common to the generator shaft, is provided so that when it is rotated by a suitable source of mechanical power, the system 10 is electrically self-started and self-sustained for electrical power generation by means of the pilot and main exciters.

The main exciter 12 receives its field energization from the pilot exciter 11, and, in turn, provides field energization for the main generator 14 through the diode assembly 13.

Figure 2:
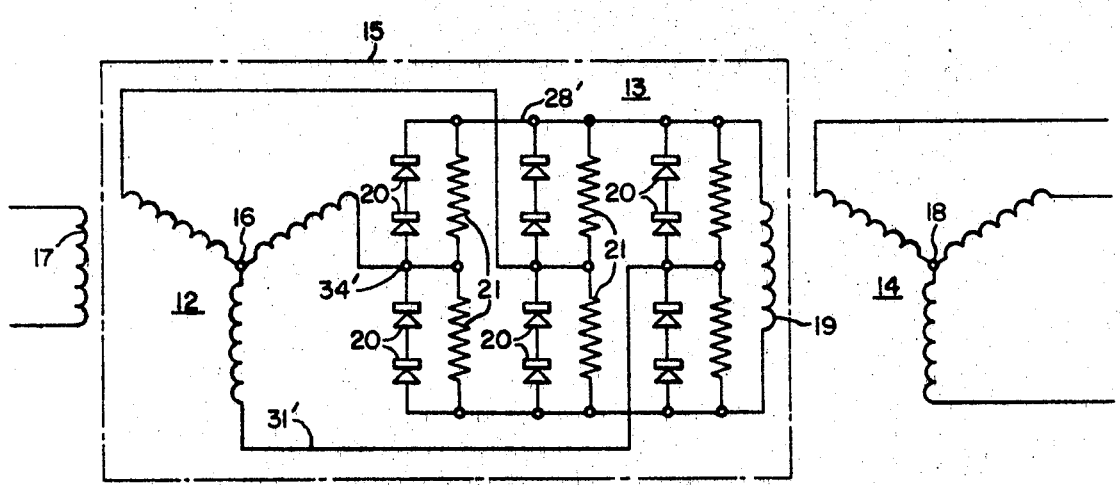

As shown in FIG. 2, the alternating current exciter 12 has a three phase armature winding 16 (carried on the shaft 15) and a stationary field winding 17 excitable by a suitable direct current source such as the pilot exciter 11. The main generator 14 includes a stationary three phase winding 18 and a rotary field winding 19 carried on the shaft 15.

In operation, the generator field winding 19 is supplied with direct current excitation from the diode assembly 13 which includes a plurality of diode devices 20 (and voltage dividing resistors 21) connected to receive and rectify the three phase alternating current output from the main exciter 12. In this manner, direct current excitation is supplied to the main generator field without the use of a commutator or slip rings and brushes.

Figure 3:
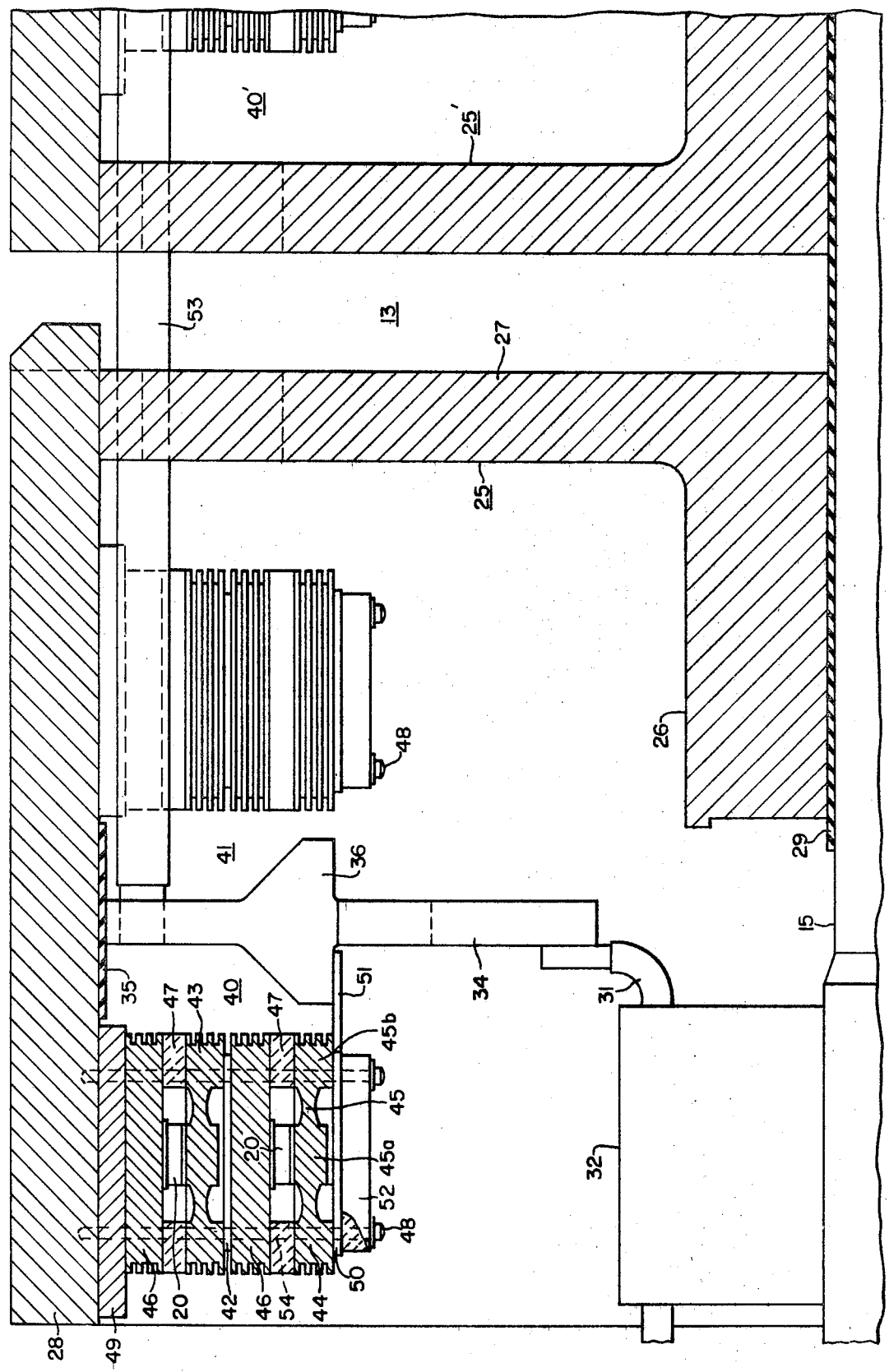
FIG. 3 is a partial side elevation and cross sectional view of a rectifier wheel supporting resilient heat sinks constructed in accordance with the principles of the invention.
Figure 4:
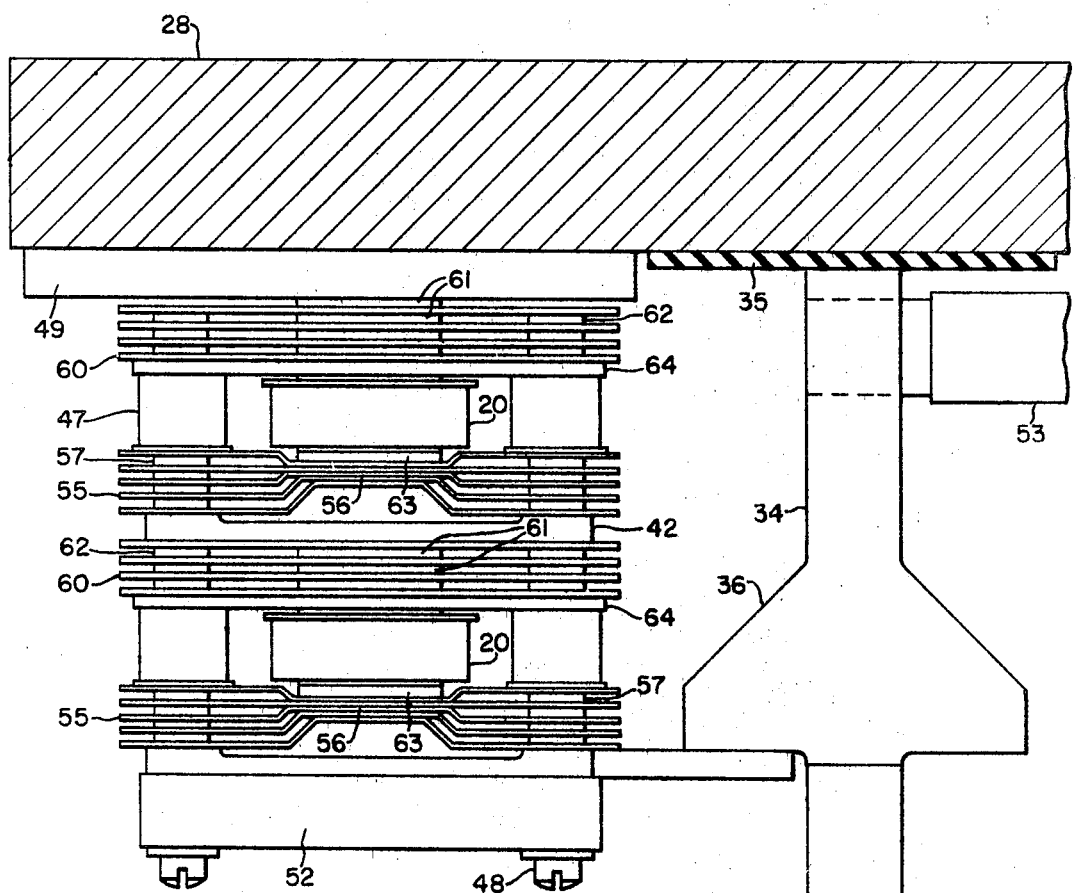
FIG. 4 is a side elevation view of an alternative embodiment of the invention and, FIG. 5 is a partial side elevation and cross sectional view of a further alternative embodiment of the invention.

FIGS. 3 and 4 show preferred constructions of the diode assembly 13 which includes a rotating rectifiers wheel structure 25 suitably mounted on and secured to the shaft 15.

The wheel structure 25 comprises a hub portion 26, and radially extending wall or spider member 27 and an annular rim or flange 28 for supporting the diodes 20 and the diode support structure presently to be explained. The rim or flange 28 can serve as a circumferential bus for connecting the diodes or resistances (see 28 in FIG. 2) or its function can be limited to supporting the diode heat sinks. For purposes of this disclosure, only a left-hand wheel section is particularly described, a right-hand wheel portion 25' being only partially shown in back-to-back relationship with the wheel 25. The right-hand portion 25' would have substantially identical portions and components as the left-hand wheel 25.

The hub portion 26 of the rectifier wheel is fitted about an insulating tube 29, and is supported on the shaft 15 by a suitable keying arrangement (not shown) with the insulating tube located between the hub and shaft.

Connections from the main exciter 12 are made by way of phase leads 31 (only one of which is shown) which extend along the shaft 15, and are supported thereon by support rings 32 which serve to support a plurality of such leads about the shaft. Each of the phase leads is brought through the rings 32 to be suitably attached to a rigid conductor 34 extending radially and inwardly from the flange 28, and suitably secured to the inside surface thereof as shown in FIG. 3. An insulating pad 35 is disposed between the mounted end of the rigid conductor and the inside surface of the wheel flange. The rigid conductor 34 is provided with opposed lateral extensions 36 which serve as diode connecting means in a manner presently to be described.

In FIG. 3, the flange 28 of the rectifier wheel 25 is shown supporting two diode stacks 40 and 41 comprising resilient heat sinks constructed in a manner presently to be explained. The stacks are disposed on each side of the rigid conductor 34, as shown, and a plurality of stacks are spaced along the inside surface of the flange about the shaft 15 to form an annular array of stacks. The left-hand stack 40 in FIG. 3 is shown in cross-section so as to expose the diodes 20 in elevation.

The diode stack 40 is representative of the other stacks disposed on the wheels 25 and 25' so that only the stack 40 is particularly described. For purposes of illustration two flat package diode devices 20 are shown supported in each stack though the invention is not limited thereto.

In FIG. 3, the resilient characteristic of the diode stacks is provided by employing at least two resilient or spring type heat sink structures 43 and 44 per stack along with two non-resilient heat sinks 46. The upper non-resilient heat sink 46 is disposed between the wheel flange 28 and the upper diode 20; the lower non-resilient heat sink 46 is disposed between the lower diode 20 and an intermediate resilient heat sink 43. The stack is completed (assuming a two diode stack) by a fourth heat sink, namely the (lower) resilient heat sink 44 disposed beneath the lower diode 20, and in electrical and physical contact therewith. Between the heat sink 43 and the lower non-resilient heat sink 46 is disposed a metal spacer or plate 42.

The resiliency of the heat sinks 43 and 44 is provided by an annular narrow spring portion 45 formed in the heat sink body. The body has further a thick center portion 45a and a thick finned peripheral portion 45b for properly supporting the diodes and for providing heat dissipation respectively. For convenience, reference numerals 45, 45a, and 45b are shown only on the portions of element 44 in FIG. 3 although like portions also exist in heat sink 43.

Between the heat sinks separated by a diode 20 is disposed heat resistant insulating spacers 47. The spacers lie in the same plane as the diodes adjacent the periphery of the heat sinks. The spacers 47 serve to physically support and electrically insulate the heat sinks separated by a diode 20.

The heat sinks 43, 44 and 46 and the spacers 47 are held together by suitable means, such as bolts 48 extending through the stacks 40 and 41, and the stacks may be similarly secured to the wheel flange 28 by bolt means 48 extending through aligned openings 54 provided in the heat sinks and the insulating spacers, and threaded into tapped holes provided in the flange 28. If metal bolts are used as the securing means, an insulating sleeve disposed about each bolt is necessary to prevent shorting of the heat sinks across the diodes 20.

The heat sinks 43, 44 and 46 are disposed in physical and electrical contact with the diodes 20 on the opposed planar surface of the diodes as shown in FIG. 3. The planar surfaces of the diode are metal, and form terminal contacts which are pressed against the flat contacting surface of the heat sinks by virtue of the resilient characteristic of the heat sinks 43 and 44.

The resilient or spring portion 45 of the heat sinks 43 and 44 is formed to provide sufficient pressure on the diodes while the rectifier wheel 25 is stationary so that good electrical contact is maintained for testing and for other such purposes. With rotation of the rectifier wheel, the pressure on the diodes is maintained by the spring's mass pressing against the diodes and wheel flange 28 due to centrifugal forces caused by the rotation. The spring-mass parameters are such that the diodes are not overloaded with rotation however.

For efficient manufacturing and assembly purposes, the resilient heat sinks 43 and 44 have a broad, relatively flat load deflection characteristic. This is provided by using the heat sink resilient material in its plastic range.

The resilient heat sinks, however, are elastically capable of maintaining the desired stationary or static pressure on the diodes explained above.

Figure 5:
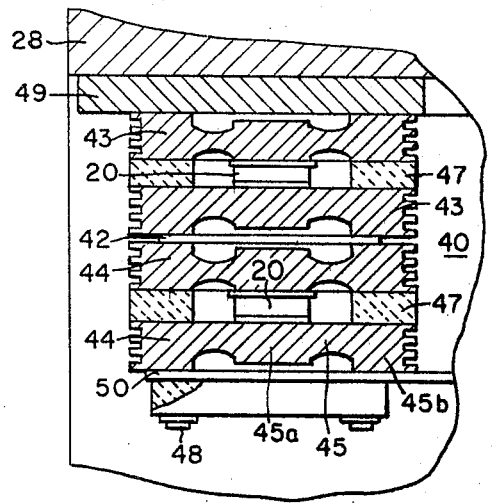

The heat sinks 46 in FIG. 3 are shown as thick, solid structures without narrow, spring forming portions. Depending upon machine design parameters and the amount of desired resiliency, all four of the heat sinks could be resilient structures, or the order of the resilient and non-resilient heat sinks could be reversed. FIG. 5 shows an embodiment, otherwise like that of FIG. 3, with resilient heat sinks 43 on each side of the diode 20 nearest the flange 28 and resilient heat sinks 44 on each side of the other diode 20.

The topmost heat sink 46 is disposed in physical and electrical contact with a metal plate or platform 49 located on the inside surface of the flange 28. The lowermost heat sink 44 is electrically connected to the rigid conductor 34 by a metal plate 50 secured to the sink by the bolts 48. The metal plate 50 has a lateral extension 51 which is suitably attached to the left side of the lateral extension 36 provided on the conductor 34. Other suitable means may be employed to electrically connect the heat sink 44 to the conductor 34.

To provide proper creepage distance between the heads and washers of the metal bolts 48, a relatively thick insulating spacer 52 is disposed beneath the plate 50.

As shown schematically in FIG. 2, the diodes 20 form six groups, two diode groups for each phase with each phase group having two serially connected diodes. Each phase voltage is applied to the field winding 19 through one diode group and returned by the other group. The phase voltage is evenly developed across the two diode groups by the voltage dividing resistors 21 by use of a common connecting point 34' connecting the serially connected diodes and their corresponding resistors to one end of the phase winding.

In FIGS. 3 and 4, the common point 34' is essentially the rigid conductor 34. The conductor is used to connect the left diode stack 40 in the exciter circuit by providing a conductive path between the lateral extension 51 of the plate 50 and the phase lead 31. Thus, the two (or more) diodes in a stack are represented by the two diodes schematically shown in FIG. 2. The actual number of diodes employed in a phase circuit and in the overall diode assembly 13 depends upon the size and type of the system 10 in which the assembly is employed as well as other desired circuit parameters and machine requirements.

If the upper left diode 20 in FIG. 2 is representative of the diode stack 40, the lower left diode represents a diode stack 40' disposed upon the right hand wheel 25' only partially shown in FIG. 3. The diode stack 40' is commonly connected to the stack 40 by the rigid conductor 34 and a horizontally extending connecting bar or lead 53 suitably attached to the upper portion of the conductor 34 (FIG. 3) and suitably attached to the diode stack 40'.

A common connection between the diode stacks in the different phase groups is provided by the wheel flange 28 which is represented schematically in FIG. 2 by the line 28'. Thus, the left-hand stack 40 (FIG. 3) is electrically connected to the right-hand stack 41 through the wheel flange as shown. The other (lower) end of the stack 41 is connected to a corresponding diode stack (not shown) disposed on the right-hand wheel 25' by another inwardly extending rigid conductor and a horizontally extending bar or lead as described above in connection with diode stacks 40 and 40'. In such a manner, the diode stacks are electrically interconnected about the inside surface of the flange 28 with phase energy from the exciter winding 16 supplied to the stacks by the leads 31. It will of course be understood that other rectifier circuits could be used, if desired, with the rectifier stacks suitably connected by means generally similar to those shown.

A modification of the embodiment of FIG. 3 is shown in FIG. 4 in which like components have the same reference numerals. In FIG. 4, the resilient heat sinks comprise a plurality of dish or cup-shaped spring plates 55 disposed in a stacked array and individually separated by peripheral metal spacers 57. Some of the spring plates have offset planar center portions which together form narrow center portions generally designated 56.

The non-resilient heat sink structures in FIG. 4 are formed by a plurality of planar metal plates 60 disposed in a stacked array and separated by center metal spacers 61 and peripheral metal spacers 62.

The cup-shaped plates 55 and the planar plates 60 are grouped and electrically separated by heat resistant insulating spacers 47 and a center spacer 42 to form four heat sink units as shown in the embodiment of FIG. 3.

In FIG. 4, the four heat sink units are disposed in physical and electrical contact with the diodes through the center metal discs 63 disposed against the lower surface of each diode and an additional metal plate 64 on the supper surface of each diode. The complete assembly may be secured together and fastened to the wheel flange 28 as described above with reference to FIG. 3.

The diodes shown in FIG. 4 form part of a diode circuit electrically interconnected as described above with reference to FIG. 3. Similarly, the spring constants of the resilient plates 55 are chosen and formed to provide continuous pressure on the diode terminals for both stationary and rotating operation.

From the foregoing description it should now be apparent that a new pressure diode arrangement has been disclosed for rotating brushless exciters and for static applications. The arrangement includes flat package diodes disposed between heat sink structures of which at least one is resilient and applies an appropriate pressure on the diode sides and terminal surfaces to insure good thermal and electrical conductivity. Thus, more efficient heat dissipation is obtained since heat is removed simultaneously from both sides of the diode, and the diode is conveniently connected in external circuits and in electrical series with other diodes through the heat sinks contacting the flat diode terminals. No fuses are necessary for protecting the exciter circuits from shorted diodes since other non-shorted, serially connected diodes continue to function.

Though the invention has been described with a certain degree of particularly, it should be noted that changes may be made therein without departing from the spirit and scope of the invention.

What is claimed is:

1. A heat sink-diode ararngement for supporting and mounting at least one pressure contact diode means having opposed planar sides, the arrangement comprising
    at least one heat sink structure disposed on each of the planar sides of a diode means in electrical and physical contact therewith, each said heat sink structure having a plurality of fins extending laterally therefrom for heat dissipation,
    at least one of the heat sink structures having a resilient characteristic, said resilient heat sink structure comprising a center portion in contact with one of the planar sides of said diode means, a finned peripheral portion, and an annular spring portion intermediate said center portion and said peripheral portion,
    heat resistant insulating spacers disposed between the heat sink structures separated by the diode means and in substantially the same plane as the diode means, and
    means for securing the supporting arrangement and diode means together, and for securing the arrangement to a mounting surface.

2. The heat sink-diode arrangement of claim 1 in which the heat sink structures and the insulating spacers are provided with through, aligned openings for receiving the securing means.

3. The heat sink-diode arrangement of claim 1 in which the mounting surface is a radially inward surface portion of a rim of a rotating rectifier wheel, said resilient heat sink structure being on the radially inward side of the diode means.

4. In a rotating rectifier exciter having a rotatable rectifier assembly,
a rectifier wheel means having an annular rim portion for supporting a plurality of diode elements in annular displacement therearound,
a plurality of heat sink structures for cooling the diodes each of said heat sink structures having laterally extending heat dissipation fins,
each of said diode elements supported between two of said heat sink structures, at least one of which has a resilient characteristic and comprises a center portion in contact with one of the planar sides of said diode means, a finned peripheral portion, and an annular spring portion intermediate said center portion and said peripheral portion,
the resilient heat sink structures provides optimum pressure on the diode elements for both stationary and rotational operation.

5. The rectifier assembly of claim 4 in which the diode elements are disposed in a plurality of stacked arrays,
each of said arrays including a plurality of resilient heat sinks disposed in physical and electrical contact with the diode elements,
the diodes in each array being connected in electrical series with each other through the heat sinks.

6. The rectifier assembly of claim 4 in which the diode elements are of the pressure contact type having a substantially disc-shaped configuration.

7. The subject matter of claim 1 comprising a plurality of said diode means in stacked relation with one of said heat sink structures stacked on each side of each diode including at least one resilient heat sink structure adjacent each diode means, said plurality of diode means being electrically connected in series through said heat sink structures.

8. The subject matter of claim 1 wherein: said heat sink structures on each side of said diode means are configured as said resilient heat sink structure.

9. The subject matter of claim 1 wherein: said resilient heat sink structure comprises a unitary conductive member having said center portion, said finned peripheral portion and said annular spring portion.

10. The subject matter of claim 9 wherein: said spring portion is of narrower cross-section compared with said center and peripheral portions.

11. The subject matter of claim 1 wherein: said resilient heat sink structure comprises a plurality of spring plates of which at least some are dish-shaped, said center portions of said heat sink structure comprises center portions of each of said spring plates in direct contact with each other and said diode means, said peripheral portion of said heat sink structure comprises peripheral portions of each of said spring plates spaced from each other by annular metal spacers with peripheral extremes of said spring plates extending outwardly beyond said metal spacers and defining fins for heat dissipation.

References Cited

UNITED STATES PATENTS

| | | | |
|---|---|---|---|
| 3,280,389 | 10/1966 | Martin | 317—234 |
| 3,307,087 | 2/1967 | Rogers et al. | 317—234 |
| 3,356,914 | 12/1967 | Whigham et al. | 317—234 |
| 3,373,335 | 3/1968 | Rosenberg | 321—11 |

JOHN W. HUCKERT, Primary Examiner

R. F. POLISSACK, Assistant Examiner

U.S. Cl. X.R.

317—235